Sept. 17, 1963            J. C. KELLY            3,103,994
WHEEL AND BRAKE DRUM ASSEMBLY
Filed March 23, 1961            3 Sheets-Sheet 1
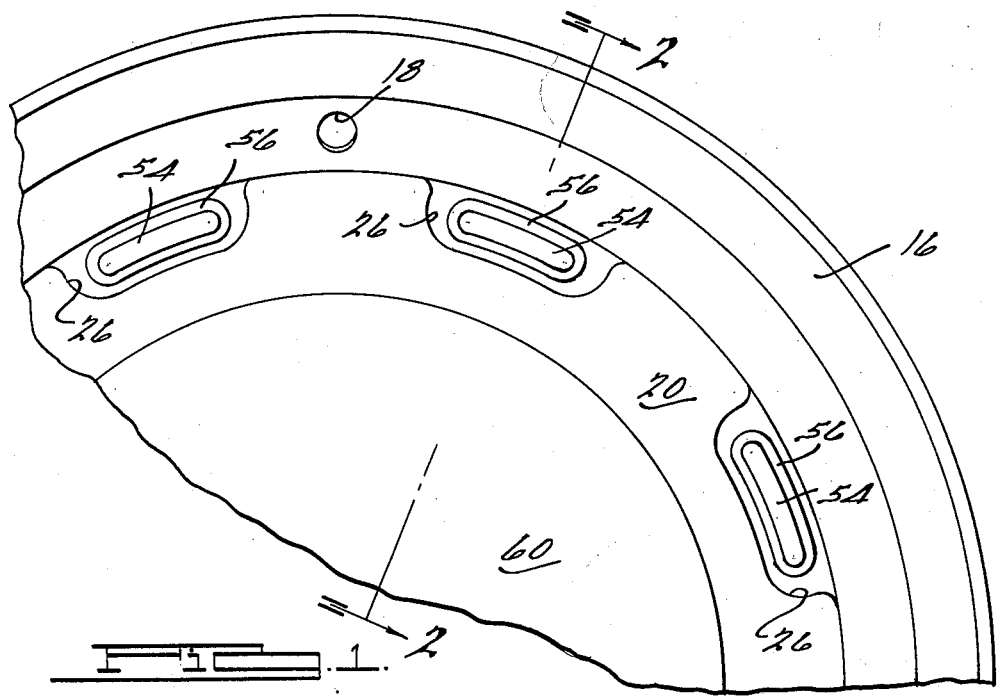
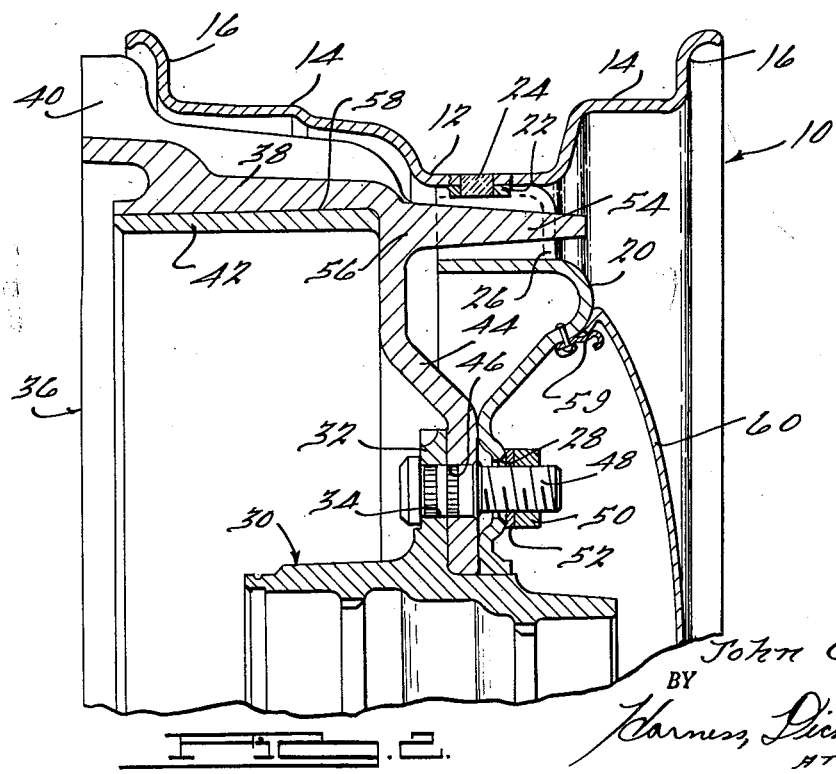
INVENTOR.
John C. Kelly.
BY
Harness, Dickey & Pierce
ATTORNEYS INVENTOR.
John C. Kelly Sept. 17, 1963  J. C. KELLY  3,103,994
WHEEL AND BRAKE DRUM ASSEMBLY
Filed March 23, 1961  3 Sheets-Sheet 3

INVENTOR.
John C. Kelly.
BY
Harness, Dickey & Pierce
ATTORNEYS

United States Patent Office 3,103,994
Patented Sept. 17, 1963

3,103,994
WHEEL AND BRAKE DRUM ASSEMBLY
John C. Kelly, Jackson, Mich., assignor to Kelsey-Hayes
Company, Detroit, Mich., a corporation of Delaware
Filed Mar. 23, 1961, Ser. No. 97,822
10 Claims. (Cl. 188—264)

This invention relates to improvements in brake structures and more particularly to an improved wheel and brake drum assembly.

Present day vehicles often travel at high velocities creating a large kinetic energy of motion, which in turn causes a great deal of heat to be generated during the braking of such vehicles. Such heat causes excessive wear of braking surfaces and reduces the braking efficiency.

To dissipate such heat, the wheel and brake drum assembly combination is preferably arranged to achieve maximum cooling. Such an arrangement often detracts from the appearance of the wheel assembly or is expensive to manufacture.

Therefore, it is an important object of the present invention to improve the heat transfer rate from a brake lining in an attractive wheel and brake drum assembly.

It is a further object of the invention to directly and quickly conduct heat away from a braking surface to the exterior of an attractive wheel and brake drum assembly.

It is a further object of the invention to provide an improved wheel and brake drum assembly having a separate load-carrying wheel structure for separating wheel loads from brake loads and brake heat and further having a portion of the brake drum extending outwardly of the exposed surface of the wheel structure for dissipating brake heat.

A still further object of the invention is to provide an improved wheel and brake drum assembly having a plurality of circumferentially disposed axially outwardly extending vanes which conduct heat directly from a braking surface and dissipate the heat by radiation over a substantial surface area and by the convective effect of a relative air stream of substantial magnitude.

A still further object of the invention is to provide an economical, compactly arranged wheel and brake drum assembly which is easily assembled, attractive in appearance, and an effective heat dissipating device.

Further objects, features and advantages of this invention will become apparent from a consideration of the following description, the appended claims and the accompanying drawing in which:

FIGURE 1 is a side elevational view of a portion of a wheel and brake drum assembly constructed in accordance with the principles of the present invention;

FIGURE 2 is a sectional view taken along the line 2—2 of FIGURE 1 looking in the direction of the arrows;

Figure 3:
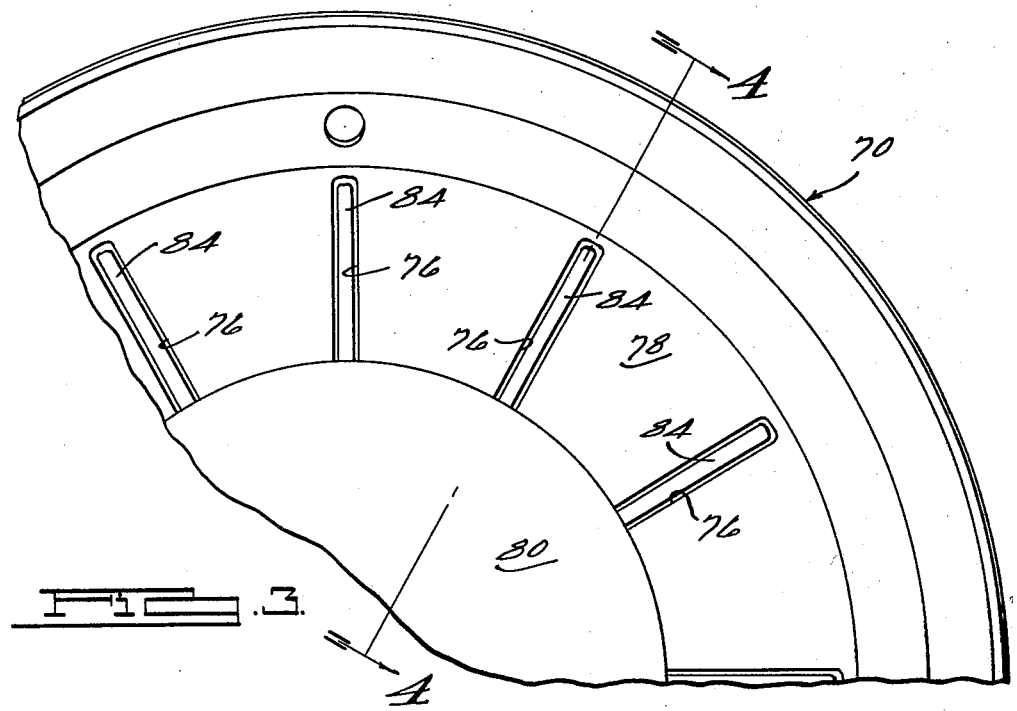
FIGURE 3 is a side elevational view of a portion of a modified form of the wheel and brake drum assembly of FIGURES 1 and 2.

Referring now to the drawings, FIGURES 1 and 2 illustrate a preferred embodiment of the invention wherein reference character 10 generally designates a wheel assembly having an outer peripheral rim defined by an annular drop center portion 12, tire bead seats 14 and radially extending axially outer circumferentially disposed tire retaining flanges 16 which hold the side walls of a suitable tire structure with respect to the wheel assembly 10. The side of the drop center portion 12 of the wheel assembly 10 has an aperture 18 adapted to receive the valve stem of the tire carried on the peripheral rim portion of the wheel assembly 10.

A wheel disc or spider 20 has an axially inwardly projecting flange portion 22 which fits inside the annular drop center portion 12. Suitable fastening means such as a plurality of circumferentially spaced welds 24 connect the flange portion 22 to the drop center portion 12 for forming the completed wheel assembly 10. The wheel disc 20 has a plurality of circumferentially disposed apertures 26 formed near its outer periphery and a plurality of circumferentially spaced apertures 28 located near its inner periphery.

A standard hub assembly 30 has a radially outwardly extending flange 32 at its midpoint. The hub assembly 30 is adapted to mount on a suitable axle bearing arrangement and is connected thereon by suitable fastening means such as a nut on a threaded spindle as is conventionally the case. A plurality of circumferentially disposed apertures 34 formed in the flange 32 are adapted to axially align with the apertures 28 in the wheel disc 20.

A brake drum assembly generally designated 36, has a radially outer circumferential flange 38 which carries a plurality of circumferentially spaced reinforcing ribs 40 on its outer periphery and a braking liner 42 on its inner periphery. The braking liner 42 consists of any suitable high temperature and wear-resistant material such as cast iron or a high silicon aluminum alloy.

The circumferential flange portion 38 of the brake drum assembly 36 has a radially inwardly extending, disc-like web 44 which has a plurality of circumferentially disposed apertures 46 at its inner periphery which are adapted to axially align with the apertures 28, 34 in the wheel disc 20 and hub flange 32, respectively. A suitable fastening means, such as a stud 48 extends through the axially aligned apertures 28, 34, 46 for fastening the hub, brake drum and wheel assemblies in axially aligned abutment. A nut 50 and washer 52 are threadingly engageable with the stud 48 to lock the axially aligned assemblies together. It is important to note that wheel loads are separated from brake loads and brake heat since the wheel assembly 10 defines a load-carrying structure which is separate from the brake drum assembly 36.

A plurality of circumferentially disposed cooling vanes 54 located at the outer periphery of the brake drum web 44 are in axial alignment with the wheel disc apertures 26. The brake drum assembly 36 including the vanes 54 is preferably of aluminum or other high heat dissipating material. This preferred choice of material is also true in the case of the embodiments which follow. The axially outer ends of the vanes 54 extend axially outwardly of the wheel disc 20 for reasons to be discussed. The axially inward root 56 of each vane 54 defines an arcuate section in direct contact with a "hot" region 58 defined by the interface between the circumferential flange 38 and the liner 42. The conductive paths between the liner 42 and the cooling vanes 54 are quite short and, therefore, materially contribute to effective heat dissipation. Furthermore, the cooling vanes 54 have a substantial surface area which quickly radiates the heat conducted away from the "hot" region 58.

The axially outwardly extending vanes 54 extend outwardly of the wheel disc 20 so that a relative air stream of substantial velocity will pass thereover during the time the vehicle is in operation to give a maximum convective heat transfer therefrom which combines with the radiation and conductive heat transfers to materially improve the heat dissipation properties of the improved wheel and brake drum assembly.

In order to enhance the appearance of the assembly under consideration, the ends of the vanes 54 are preferably polished and the wheel disc are painted to decoratively blend with the functionally arranged, improved heat dissipating vane system.

A plurality of circumferentially disposed spring clips 59 on the axially outer side of the wheel disc 20 carry a suitable hub cap or wheel cover 60 which is spring-biased by the spring clips 59 against the wheel disc 20 to enhance the overall appearance of the assembly by concealing the connecting nut and studs and the hub connecting arrangement.

Figure 4:
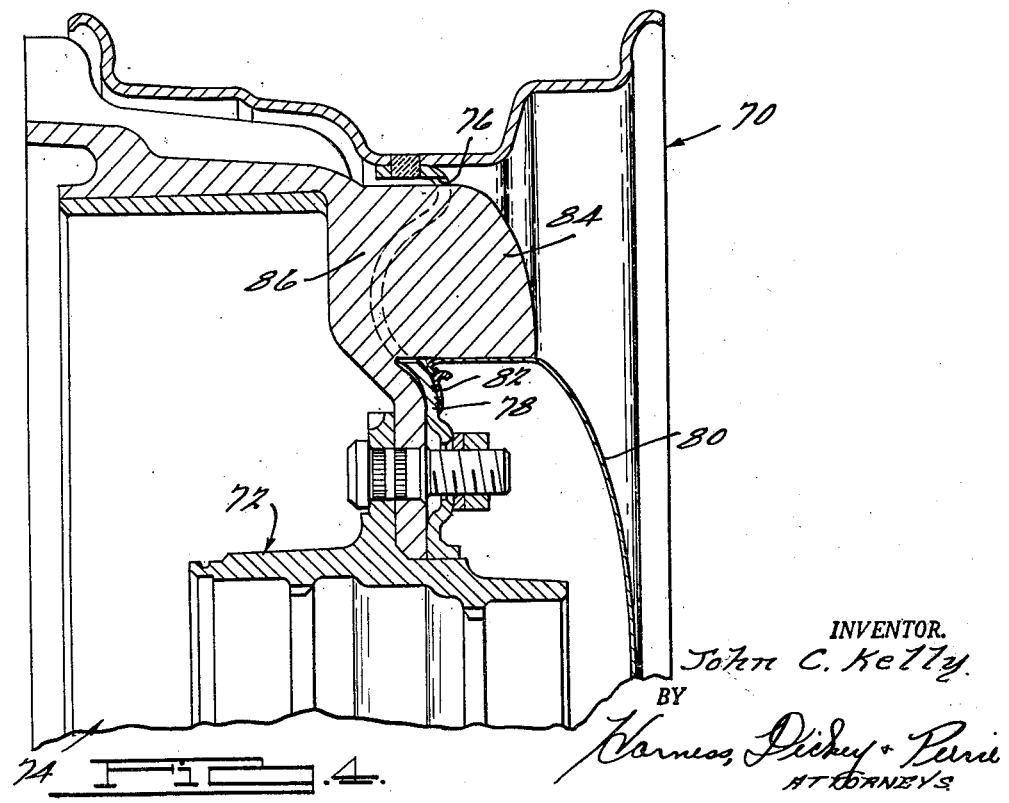
FIGURE 4 is a sectional view taken along the line 4—4 of FIGURE 3 looking in the direction of the arrows.

Another embodiment of the invention is illustrated in FIGURES 3 and 4 and includes a wheel assembly unit 70 which is the counterpart of the wheel assembly unit 10 in the embodiment illustrated in FIGURES 1 and 2. The wheel assembly unit 70 has the same drop center portion, bead seat, and tire retaining flange arrangement as in the first embodiment and includes a hub assembly 72 which is the counterpart of the hub assembly 28 in the first embodiment. The hub assembly 72 carries the wheel assembly 70 and a brake drum assembly 74 which is also a counterpart of the brake drum assembly 34 of the first embodiment.

The unit differs from that illustrated in the first embodiment in that the wheel assembly of the first embodiment has been modified to include a plurality of circumferentially disposed apertures 76 which extend from the outer radial periphery of a wheel disc 78 to a point adjacent a wheel cover 80 which is connected to the wheel assembly 70 by suitable clip means 82 which are the counterparts of spring clips illustrated in the first embodiment.

A plurality of vanes 84 are circumferentially spaced around the web portion of the brake drum assembly 74 as were the vanes 54 of the first embodiment. The vanes 84, however, extend radially over a substantial portion of the brake web. Nevertheless, a substantial portion of the root 86 of each vane 84 is axially outwardly of the interface of the liner and radially outer flange portions of the brake drum assembly 74. The vanes 84 serve the same purpose in this embodiment as in the embodiment of FIGURES 1 and 2 and the configuration of the vanes 84 give an effective heat dissipation equivalent to the vanes 54 illustrated in FIGURES 1 and 2. As compared to the vanes 54 of the preferred embodiment, a greater portion of the vanes 84 extend into a high relative velocity air stream. Therefore, the convective heat dissipation is improved sufficiently to compensate for the fact that a portion of each vane 84 is farther away from the braking liner of the brake drum assembly 74.

Figure 5:
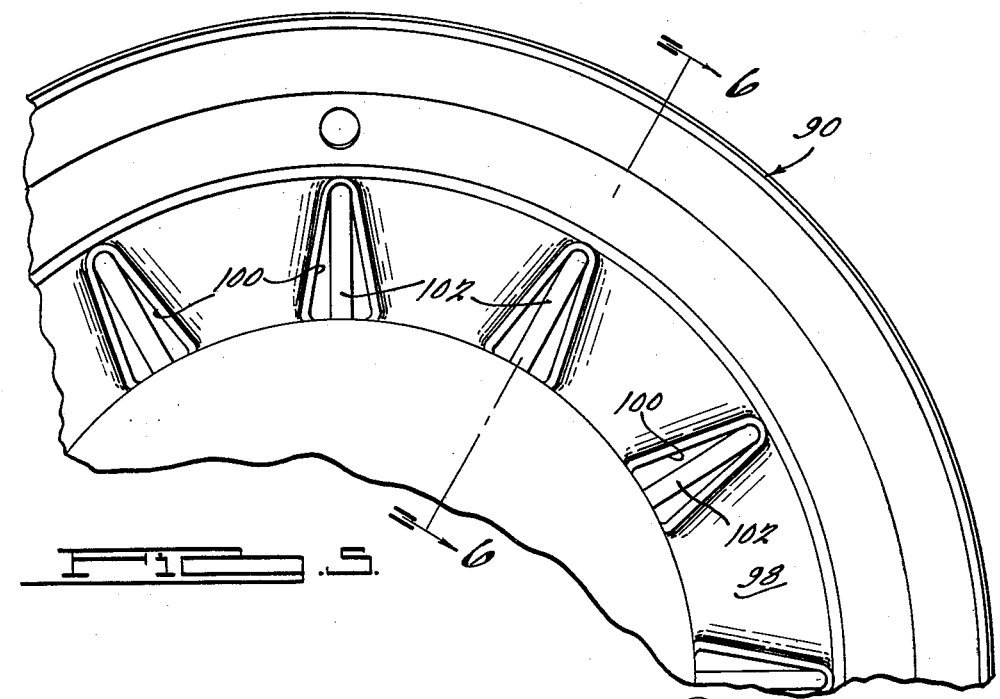
FIGURE 5 is a side elevational view of a portion of another embodiment of the invention.
Figure 6:
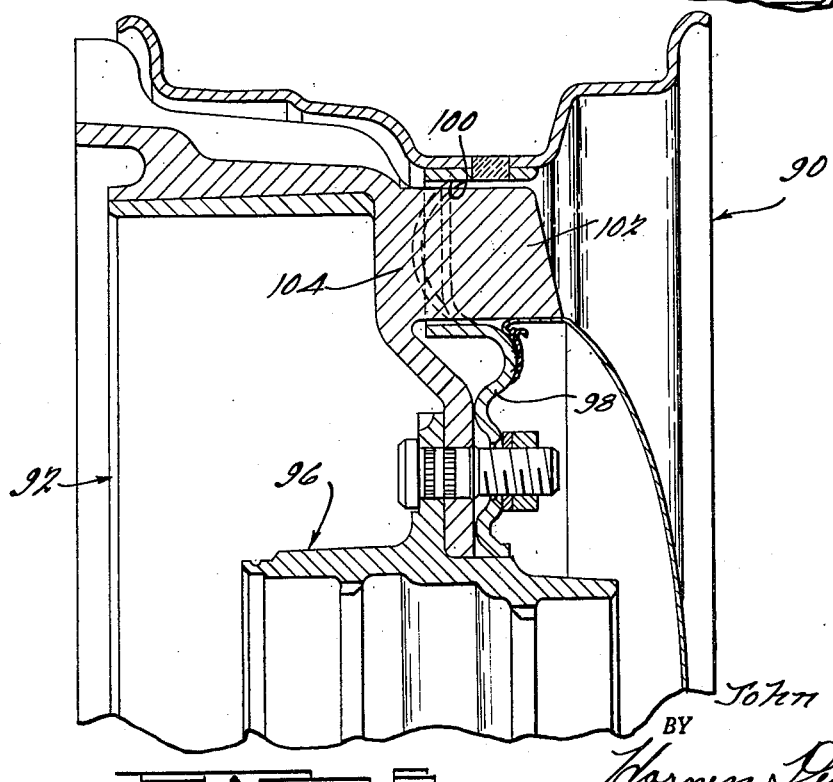
FIGURE 6 is a sectional view taken along the line 6—6 of FIGURE 5 looking in the direction of the arrows.

A third embodiment of the invention is illustrated in FIGURES 5 and 6 which has a wheel assembly 90, which is the counterpart of the wheel assemblies of the earlier embodiments, a brake drum assembly 92 which is the counterpart of the earlier assemblies except for a modified vane arrangement to be described. The brake drum assembly 92 and wheel assembly 90 are bolted to the flange of a hub assembly 96 which is the counterpart of the hub assemblies illustrated and described in the previous embodiments.

A wheel disc 98 has a plurality of circumferentially disposed V-shaped apertures 100 formed therein which receive a plurality of circumferentially spaced vanes 102 mounted on the web of the brake drum assembly 92. A substantial portion of the root 104 of each vane 102 is axially outward of the interface defined by the peripheral flange and the liner of the brake assembly 92. The outer axial end of each vane 102 is axially outward of the wheel assembly 90. Therefore, the vanes 102 have a high convective heat dissipation effect while retaining a substantial short conductive path to a substantial portion of the vanes. The combined heat dissipiation is equivalent to that present in the previous embodiments. The V-shaped apertures 100 offer a more decorative arrangement than that disclosed in the other embodiments.

It should be noted that in each embodiment there are three separate components comprising the wheel assembly, the hub assembly and the brake drum assembly. These components are quickly bolted together to form a compact brake drum and wheel assembly suitable for mounting on any vehicle. The heat dissipating vanes on the brake drum arrangement are effectively combined with a conventional wheel assembly to offer a maximum of exposed radiation surface which is directly connected by the shortest possible conductive path to the areas of highest temperature in the brake drum assembly. Moreover, the heat dissipating vanes are disposed outwardly of the wheel disc so as to be subject to a highly turbulent convective zone outside the wheel. Thus, heat is quickly dissipated from the high heat region, (the brake liner region) to a cooler exterior region to prevent "brake fadeout" and excessive rates of liner wear.

It will be understood that the specific constructions of the improved wheel and brake drum assembly which are herein disclosed and described are presented for purposes of explanation and illustration and are not intended to indicate limits of the invention, the scope of which is defined by the following claims.

What is claimed is:

1. In combination, a brake drum having a circumferential flange portion and a radially inwardly extending web portion, a hub assembly supporting said web portion, a wheel assembly having a rim portion and a disc portion supported by said hub assembly, said disc portion having a plurality of apertures therein located at circumferentially spaced points in the radially outer portion thereof, a plurality of circumferentially, radially outwardly located vanes integrally formed on said web portion having end portions directed through said apertures and axially outwardly of said disc portion for dissipating heat from said circumferential flange portion.

2. In combination, a brake drum having a circumferential flange portion and a radially inwardly extending web portion, said circumferential flange portion having an inner peripheral surface, liner means on said inner peripheral surface adapted to frictionally engage suitable brake shoes, a hub assembly supporting said web portion, a wheel assembly having a rim portion and a disc portion supported by said hub assembly, said disc portion having a plurality of apertures located at circumferentially spaced points in the radially outer portion thereof, a plurality of circumferentially, radially outwardly located vanes integrally formed on said web portion having end portions directed through said apertures and axially outwardly of said disc portion for dissipating heat from said liner means.

3. In combination, a brake drum having a circumferential flange portion and a radially inwardly extending web portion, a hub assembly supporting said web portion, a wheel assembly having a rim portion and a disc portion supported by said hub assembly, said disc portion having a plurality of apertures therein located at circumferentially spaced points in the radially outer portion thereof, a plurality of circumferentially spaced vanes integrally formed on said web portion, each of said vanes having an arcuate root portion commencing at the radially outermost edge of said web portion and terminating at a point radially spaced from said hub assembly, each of said vanes also having a free end portion directed through said apertures and extending axially outwardly of said wheel disc portion for dissipating heat from said circumferential flange portion on said brake drum.

4. In combination, a brake drum having a circumferential flange portion and a radially inwardly extending web portion, a hub assembly supporting said web portion, a wheel assembly having a rim portion and a disc portion supported by said hub assembly, said disc portion having a plurality of apertures therein located at circumferentially spaced points in the radially outer portion thereof, a wheel cover releasably engaging said disc portion, a plurality of circumferentially spaced vanes, each of said vanes having a root portion integrally formed on said web portion extending radially outwardly from said wheel cover to the radially outermost edge of said web portion, each of said vanes also having a free end portion directed through one of said apertures and extending axially outwardly of said wheel disc portion for dissipating heat from said circumferential flange portion on said brake drum.

5. In combination, a brake drum having a circumferential flange portion and a radially inwardly extending web portion, said circumferential flange portion having an inner peripheral surface, liner means on said inner peripheral surface adapted to frictionally engage suitable brake shoes, a hub assembly supporting said web portion, a wheel assembly having a rim portion and a disc portion supported by said hub assembly, said disc portion having a plurality of apertures located therein at circumferentially spaced points in the radially outer portion thereof, a plurality of circumferentially spaced vanes, each of said vanes having an arcuate root portion integrally formed on said web portion commencing at the radially outermost edge of said web portion and terminating adjacent the interface between said flange portion and said liner means, each of said vanes also having a free end portion direct through one of said apertures in said wheel disc portion and extending axially outwardly of said wheel disc portion for dissipating heat from the interface between said flange portion and said liner means.

6. In combination, a brake drum having a circumferential flange portion and a radially inwardly extending web portion, said circumferential flange portion having an inner peripheral surface, liner means on said inner peripheral surface adapted to frictionally engage suitable brake shoes, a hub assembly supporting said web portion, a wheel assembly having a rim portion and a disc portion supported by said hub assembly, said disc portion having a plurality of apertures located at circumferentially spaced points in the radially outer portion thereof, a wheel cover releasably engaging said disc portion, a plurality of circumferentially spaced vanes, each of said vanes having a root portion integrally formed on said web portion extending radially outwardly from said wheel cover to the radially outermost edge of said web portion, each of said root portions extending axially outwardly at the radially outermost edge of said web portion and terminating in a free end portion axially outwardly of said wheel disc portion for dissipating heat from said liner means on said inner peripheral surface.

7. In combination, a brake drum having a circumferential flange portion and a radially inwardly extending web portion, a hub assembly supporting said web portion, a wheel assembly having a rim portion and a radially inwardly extending disc portion supported by said hub assembly, said hub assembly, disc portion, and web portion each having a plurality of circumferentially spaced radially inwardly located apertures, fastening means extending through said radially inwardly located apertures for connecting said web portion and said disc portion to said hub assembly, a plurality of circumferentially spaced clip means on said disc portion, wheel cover means on said clip means extending diametrically across the outer side of said disc portion, said disc portion having a plurality of apertures therein located at circumferentially spaced points in the radially outer portion thereof, a plurality of circumferentially spaced radially outwardly located vanes, each of said vanes having a root portion integrally formed on said web portion and an outer end directed through said radially outwardly located apertures on said disc portion and extending axially outwardly of said disc portion for dissipating heat from said circumferential flange portion.

8. In combination, a brake drum having a circumferential flange portion and a radially inwardly extending web portion, said circumferential flange portion having an inner peripheral surface, liner means on said inner peripheral surface adapted to frictionally engage suitable brake shoes, a hub assembly supporting said web portion, a wheel assembly having a rim portion and a radially inwardly extending disc portion supported by said hub assembly, said hub assembly, disc portion, and web portion each having a plurality of circumferentially spaced radially inwardly located apertures, fastening means extending through said radially inwardly located apertures for connecting said web portion and said disc portion to said hub assembly, a plurality of circumferentially spaced clip means on said disc portion, wheel cover means on said clip means extending diametrically across the outer side of said disc portion, said disc portion having a plurality of apertures therein located at circumferentially spaced points in the radially outer portion thereof, a plurality of integrally formed circumferentially spaced vanes having root portions located radially outwardly on said web portion and having outer end portions directed through said radially outwardly located apertures and extending axially outwardly of said disc portion for dissipating heat from said liner means on said inner peripheral surface of said curcumferential flange portion.

9. In combination, a brake drum having a circumferential flange portion and a radially inwardly extending web portion, said circumferential flange portion having an inner peripheral surface, liner means on said inner peripheral surface adapted to frictionally engage suitable brake shoes, a hub assembly supporting said web portion, a wheel assembly having a rim portion and a radially inwardly extending disc portion supported by said hub assembly, said hub assembly, disc portion, and web portion each having a plurality of circumferentially spaced radially inwardly located apertures, fastening means extending through said radially inwardly located apertures for connecting said web portion and said disc portion to said hub assembly, a plurality of circumferentially spaced clip means on said disc portion, wheel cover means on said clip means extending diametrically across the outer side of said disc portion, said disc portion having a plurality of apertures therein located at circumferentially spaced points in the radially outer portion thereof, a plurality of integrally formed circumferentially spaced vanes, each of said vanes having an arcuate root portion on said web portion commencing at the radially outermost edge of said web portion and terminating at a point adjacent the interface between said flange portion and said liner means, each of said vanes also having a free end portion directed through one of said radially outwardly located apertures and extending axially outwardly of said wheel disc portion for dissipating heat from said liner means on said peripheral surface of said circumferential flange portion.

10. In combination, a brake drum having a circumferential flange portion and a radially inwardly extending web portion, said circumferential flange portion having an inner peripheral surface, liner means on said inner peripheral surface adapted to frictionally engage suitable brake shoes, a hub assembly supporting said web portion, a wheel assembly having a rim portion and a radially inwardly extending disc portion supported by said hub assembly, said hub assembly, disc portion, and web portion each having a plurality of circumferentially spaced radially inwardly located apertures, fastening means extending through said radially inwardly located apertures for connecting said web portion and said disc portion to said hub assembly, a plurality of circumferentially spaced clip means on said disc portion, wheel cover means on said clip means extending diametrically across the outer side of said disc portion, said disc portion having a plurality of apertures therein located at circumferentially spaced points in the radially outer portion thereof, a plurality of integrally formed circumferentially spaced vanes, each of said vanes having a root portion on said web portion extending radially outwardly from said wheel cover means to the radially outermost edge of said web portion, said root portion extending axially outwardly at the radially outermost edge of said web portion through said radially outwardly located apertures in said wheel disc portion and terminating in a free end portion axially outwardly of said wheel disc portion for dissipating heat from said liner means on said inner peripheral surface of said circumferential flange portion.

References Cited in the file of this patent

UNITED STATES PATENTS

| | | |
|---|---|---|
| 1,931,946 | Zerk | Oct. 24, 1933 |
| 1,934,443 | Norton | Nov. 7, 1933 |
| 2,198,057 | Lyon | Apr. 23, 1940 |
| 2,687,192 | Butterfield | Aug. 24, 1954 |
| 2,740,502 | Butterfield | Apr. 3, 1956 |
| 2,761,530 | Dawley | Sept. 4, 1956 |
| 2,896,749 | Gaylord | July 28, 1959 |
| 2,998,870 | Herman et al. | Sept. 5, 1961 |
| 3,007,553 | Sinclair | Nov. 7, 1961 |
| 3,016,269 | De Lorean | Jan. 9, 1962 |
| 3,029,909 | Thomas | Apr. 17, 1962 |
| 3,043,631 | Swoboda | July 10, 1962 |

FOREIGN PATENTS

| | | |
|---|---|---|
| 1,193,889 | France | May 4, 1959 |
| 469,803 | Great Britain | July 27, 1937 |